US008542399B2

(12) United States Patent
Yamazaki

(10) Patent No.: US 8,542,399 B2
(45) Date of Patent: Sep. 24, 2013

(54) PRINTING MEDIUM MOVEMENT AMOUNT DETECTION DEVICE, AND ERROR INFORMATION PRODUCTION METHOD

(75) Inventor: Akio Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 243 days.

(21) Appl. No.: 13/044,016

(22) Filed: Mar. 9, 2011

(65) Prior Publication Data

US 2011/0242553 A1 Oct. 6, 2011

(30) Foreign Application Priority Data

Apr. 1, 2010 (JP) ................................ 2010-084891

(51) Int. Cl.
*G06K 15/10* (2006.01)

(52) U.S. Cl.
USPC ............ 358/1.5; 358/1.1; 400/582; 400/578; 271/248; 271/225; 271/226; 271/8.1

(58) Field of Classification Search
USPC ................ 400/582, 578; 271/248, 225, 226, 271/8.1; 358/1.5, 1.1
See application file for complete search history.

(56) References Cited

U.S. PATENT DOCUMENTS 5,149,980 A 9/1992 Ertel et al.
2005/0035989 A1 * 2/2005 Arakawa et al. ................ 347/16

FOREIGN PATENT DOCUMENTS

JP 06-056314 A 3/1994

* cited by examiner

*Primary Examiner* — Benny Q Tieu
*Assistant Examiner* — Martin Mushambo
(74) *Attorney, Agent, or Firm* — Global IP Counselors, LLP

(57) ABSTRACT

With a printing device in which a printing medium is moved relatively, and which prints on the printing medium, the surface of the medium is illuminated, a plurality of illuminated regions of the medium moving in this illuminated state are imaged to acquire a plurality of images. A region to be matched having a characteristic region within a first image is set out of the images, a similar region having the highest similarity to the characteristic region is determined within a second image that is different from the first image. The estimated movement amount of the medium is calculated from the positional relation between the region to be matched and the similar region. Error information indicating error in the estimated movement amount of the medium attributable to the angle of light directed at the medium is acquired, and the estimated movement amount is corrected.

4 Claims, 7 Drawing Sheets

PRINTING MEDIUM MOVEMENT AMOUNT DETECTION DEVICE, AND ERROR INFORMATION PRODUCTION METHOD

CROSS-REFERENCE TO RELATED APPLICATIONS

This application claims priority to Japanese Patent Application No. 2010-084891 filed on Apr. 1, 2010. The entire disclosure of Japanese Patent Application No. 2010-084891 is hereby incorporated herein by reference.

BACKGROUND

1. Technical Field

The present invention relates to an optical type of movement amount detection device for measuring the amount of movement of a printing medium in non-contact fashion, and to an error information production method.

2. Related Art

With a conventional printing device that performs printing while conveying a printing medium, the printing medium in contact with a roller is conveyed by the rotation of the roller. How much the printing medium has been conveyed can be ascertained from the amount of rotation of the roller and the roller diameter, but if the roller wears down and slippage occurs between the printing medium and the roller, this will result in error. Accordingly, in addition to a method for detecting the amount of movement of a printing medium from a roller that conveys said printing medium through direct contact, there is a known method in which the amount of movement of a printing medium is detected by illuminating the surface of a printing medium being conveyed by a roller, acquiring a plurality of images of the surface of this medium, and comparing these images (see, for example, Japanese Laid-Open Patent Application Publication No. H6-56314).

SUMMARY

With a method for detecting the amount of movement of a medium by illuminating the surface of a printing medium being conveyed, acquiring a plurality of images of the surface of this medium, and performing template matching between the plurality of images, which include irregular patterns constituted by the shadows of tiny bumps on the surface of the medium, for example, the calculated amount of movement of the medium included error attributable to the illumination conditions. For example, when a light source that illuminates the surface of the medium and a sensor that captures an image of this surface are fixed, and the medium is moving, the shape of shadows corresponding to bumps will vary with the position of the bumps with respect to the light source unless the angle at which the light is emitted from the light source is parallel to all the bumps on the surface of the medium. Therefore, the shape of the patterns that are subjected to template matching also varies. Accordingly, the amount of movement calculated by template matching ends up being different from the amount that medium has actually moved.

The present invention was conceived in light of the above problem, and one object thereof is to reduce the effect of error attributable to illumination conditions, and enhance the accuracy in detecting the amount a medium has moved.

A movement amount detection device according to a first aspect includes an illumination unit, an image acquisition unit, an estimated movement amount calculation section, an error information acquisition section, and a movement amount calculation section. The illumination unit is configured to illuminate one side of a medium. The image acquisition unit is configured to capture a plurality of images of the one side of the medium conveyed in a state of being illuminated by the illumination unit to acquire the images. The estimated movement amount calculation section is configured to determine a similar region whose characteristic is most similar to a characteristic of a region to be matched, which is set within one of the images, within the other of the images, and to calculate an estimated movement amount of the medium from a positional relation between the region to be matched and the similar region. The error information acquisition section is configured to acquire error information indicating a correspondence between error in the estimated movement amount attributable to an angle of light directed at the medium by the illumination unit and the estimated movement amount. The movement amount calculation section is configured to correct the estimated movement amount and to calculate the movement amount of the medium between a point when the one of the images was captured and a point when the other of the images was captured.

With this constitution, the effect of error attributable to the illumination conditions can be reduced, and the real amount of medium movement can be detected more accurately. Also, the amount of movement of the medium accurately detected with the present invention can help improve the accuracy at which a medium is conveyed by a conveyance mechanism through feedback to the processor that controls the conveyance mechanism.

The image acquisition unit acquires at least two images of one side of the medium being conveyed. These two images are captured at a time interval according to the conveyance rate, so that the image of the region of the medium corresponding to the region to be matched, which is set within one of the images, is also included in the other image. At this point, the positions and angles of the optical system and the light source that illuminates one side of the medium and the element that captures an image of one side of the medium are fixed relative to each other, whereas the medium moves relative to the optical system, the light source, and the imaging element. The captured images include shadows corresponding to tiny bumps on the surface of the medium. The estimated movement amount calculation section calculates the estimated movement amount of the medium by performing what is known as template matching on the above-mentioned group of images. The template matching is performed on the basis of patterns of shadows corresponding to tiny bumps on the medium surface. However, the estimated movement amount may include error attributable to the angle of the light directed at one side of the medium. This is because when the light directed at one side of the medium is not parallel light, but radiated light, the positional relation to the light source causes the shape and position of the shadows corresponding to bumps on the surface of the medium to vary. For example, the two or more images mentioned above are obtained by imaging the medium as it is conveyed, so the positional relation between the light source and the bumps on the medium surface when one image is captured varies from the positional relation between the light source and said bumps when the other image is captured. Therefore, the shadows corresponding to given bumps also have different shapes. Also, the amount of movement of the shadows differs in relation to the real amount of movement of the bumps. Accordingly, error may occur in the estimated movement amount calculated for this group of images, but in the present invention, the accuracy at which the amount of movement of the medium is detected can be increased by correcting the estimated movement amount by using error information.

The error information is information that is produced ahead of time, and may be held in a location that is accessible from the movement amount detection device. As long as the value of the above-mentioned error corresponding to the estimated movement amount can be ultimately derived, the information may be in any format. Error here means the difference between the amount the medium has actually moved (actual movement amount) and the estimated movement amount found by template matching (error=estimated movement amount−actual movement amount). Therefore, the error information acquisition section acquires the result of calculating the estimated movement amount or error for each specific actual movement amount ahead of time, and producing the relation between them as error information.

In the movement amount detection device as described above, the error information is preferably produced ahead of time according to a distance between a light source of the illumination unit and the region on the one side of the medium corresponding to the region to be matched set within the one of the images in a direction perpendicular to the medium, and the movement amount calculation section is preferably configured to correct the estimated movement amount by using the error information according to the distance corresponding to the region to be matched set at the estimated movement amount calculation section.

The region to be matched is the region to undergo template matching, and a region that includes a distinctive graphic pattern is preferably set as the region to be matched. In a constitution in which, rather than using a preprinted specific mark on the surface of the medium as the object of template matching, the object of the matching is part of an irregular pattern produced by the tiny bumps on the surface of the medium (such as bumps formed by the fibers of paper), a distinctive pattern that is suitable as the region to be matched is not always going to be in the same position in the conveyance direction of the medium within one image and the direction perpendicular to the conveyance direction. Therefore, the region to be matched is not necessarily always set to a fixed position within one image. Also, the degree to which the shape and position of shadows corresponding to bumps in the medium surface vary also depends on the distance between the region on one side of the medium corresponding to the region to be matched, and the light source in a direction perpendicular to the direction in which the medium is conveyed. Accordingly, the error corresponding to the estimated movement amount also varies with the above-mentioned distance. Therefore, with this constitution, the estimated movement amount can be corrected by using error information according to the distance in a direction perpendicular to the conveyance direction between the light source and the region of the medium corresponding to the position of the region to be matched, so the amount of movement of the medium can be detected even more accurately.

In the movement amount detection device as described above, the error information is preferably produced ahead of time according to a number of light sources of the illumination unit and disposition of the light sources, and the movement amount calculation section is preferably configured to correct the estimated movement amount by using the error information according to the number and disposition of the light sources of the illumination unit. The error corresponding to the estimated movement amount varies with the number of light sources and how they are laid out. Therefore, with this constitution, the estimated movement amount can be corrected by using error information according to the number of light sources and how they are laid out, so when a plurality of light sources are used to illuminate the medium, the amount of movement of the medium can be detected more accurately.

An error information production method according to another aspect includes: illuminating one side of a medium; acquiring an image of the one side of the medium; moving the medium and a light source relatively by an actual movement amount; acquiring an image of the one side of the medium after movement; among the image captured before movement and the image captured after movement, determining a similar region whose characteristic is most similar to a characteristic of a region to be matched, which is set within one of the images, within the other of the images; and calculating a difference between a position of the region to be matched and a position of the similar region, which is a difference that varies with an angle of a light emitted from a light source onto the one side of the medium.

The calculation of the difference corresponding to the actual movement amount (when the medium is moved with respect to a fixed light source, this corresponds to the estimated movement amount; when the medium is fixed and the light source is moved, this corresponds to error) can be carried out a plurality of times, varying the actual movement amount each time, which makes it possible to acquire the relation between the actual movement amount and the difference according to the actual movement amount (the estimated movement amount or error). Error information can be produced on the basis of this relation. The error information produced ahead of time in this way is referred to by the above-mentioned movement amount detection device and utilized in correcting the estimated movement amount, which allows the amount of movement of the medium to be detected more accurately.

The present invention is valid both as an invention of a method for carrying out steps corresponding to the above-mentioned means, and as an invention of a program by which a computer executes the functions of the various means. The functions of the various components cited in the claims may be realized by a hardware resource in which the functions are specified by the constitution itself, a hardware resource in which the functions are specified by a program, or a combination of these. Also, the functions of the various components are not limited to being realized by a hardware resource in which the means are physically independent of one another. Furthermore, the present invention is valid as a program recording medium. Naturally, this computer program recording medium may be a magnetic recording medium, or an opto-magnetic recording medium, or any kind of recording medium that may be developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
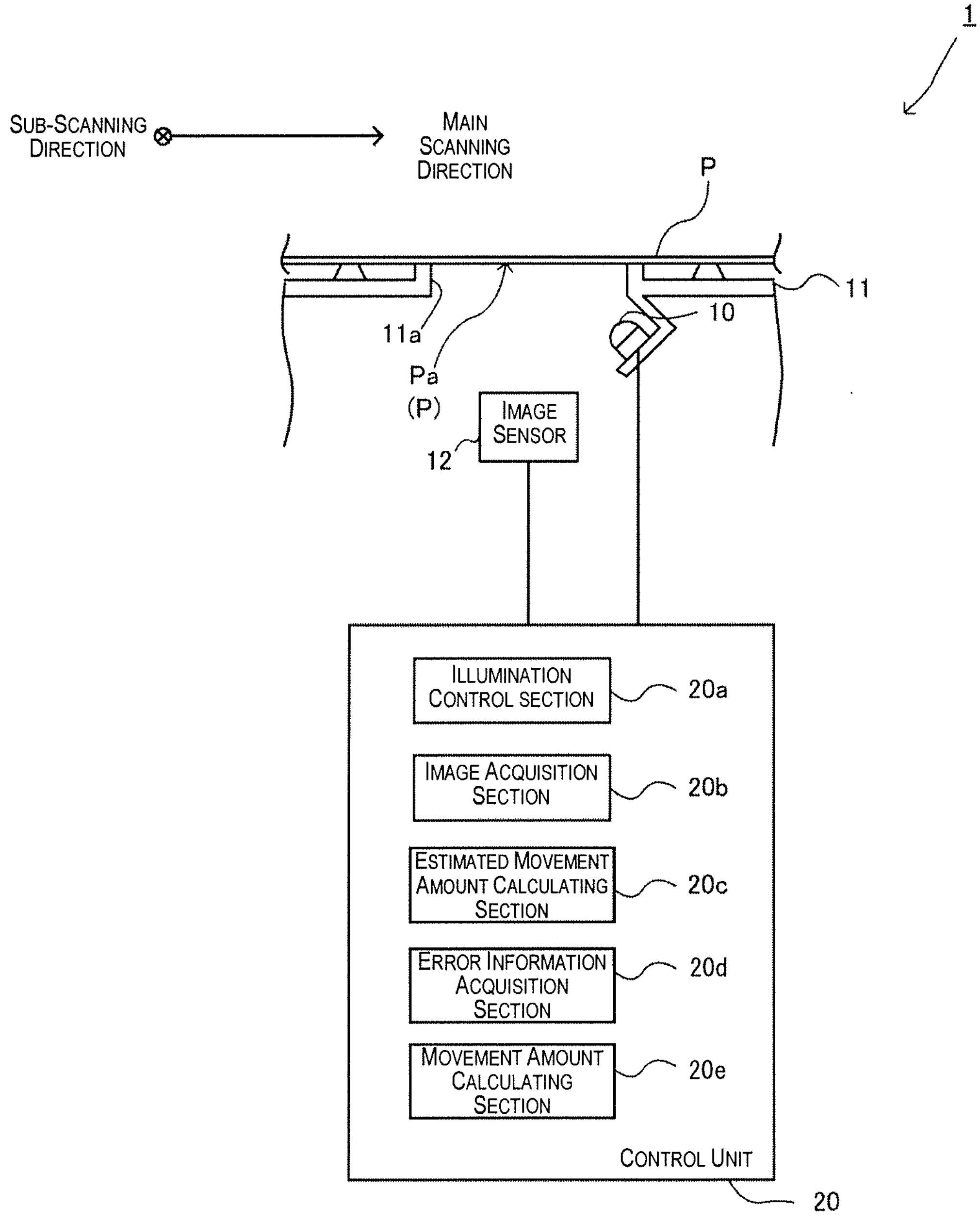
FIG. 1 is a block diagram of the configuration of the movement amount detection device pertaining to an embodiment of the present invention.

Embodiments of the present invention will now be described in the following order through reference to the appended drawings. Corresponding constituent elements in the drawings will be numbered the same, and redundant descriptions will be omitted.

1. First Embodiment

1-1. Configuration

FIG. 1 is a block diagram of the configuration of the movement amount detection device pertaining to this embodiment. The movement amount detection device 1 is provided to a printing device having the function of printing while conveying a printing medium, and comprises a function of detecting the amount of movement of a printing medium P when the printing medium P is being conveyed in a sub-scanning direction (corresponds to the conveyance direction) by a conveyance roller (not shown) provided to the printing device. The movement amount detection device 1 in this embodiment employs a method in which a plurality of images of the surface of the printing medium P are acquired, and the amount of movement of the printing medium is detected from the amount of change in the position within each image of a specific graphic pattern included in these images. The movement amount detection device 1 in this embodiment further has the function of correcting error attributable to illumination conditions included in the movement amount found as above.

To realize the above-mentioned functions, the movement amount detection device 1 comprises a control unit 20, an image sensor 12, and an optical system made up of lenses, etc. (not shown), and an LED (light emitting diode) 10. The LED 10 is attached from the lower side with respect to the conveyance plane in which the printing medium P is conveyed (a plane that includes a direction parallel to the main scanning direction and a direction parallel to the sub-scanning direction), so that light can be directed at this conveyance plane. An opening 11*a* is formed in a conveyance base 11 having the conveyance plane, and light is directed through the opening 11*a* at the printing medium P, which is supported by a conveyance roller or the like (not shown). The opening 11*a*, the LED 10, and the image sensor 12 are provided in the vicinity of the operating range of a carriage that carries a printing head. The LED 10 is electrically connected with the control unit 20 via an interface (not shown).

The image sensor 12 has the function of receiving light reflected from an irradiated face Pa of the printing medium P via an optical system (not shown) made up of lenses and so forth, and converting this light into an electrical signal. The image sensor 12 is connected with the control unit 20 via an interface (not shown) that includes an A/D converter or the like. The image sensor 12 is an area sensor, and image data for a specific number of vertical and horizontal pixels is stored in a RAM. A captured image corresponds to a rectangular region parallel to the main scanning direction and sub-scanning direction of the irradiated face Pa of the printing medium P. The image sensor 12 should be able to detect at least a brightness value corresponding to each of the pixels.

The control unit 20 is constituted by a CPU, RAM, ROM, etc. (not shown), and performs overall control of the movement amount detection device 1. More specifically, control programs stored in the ROM are executed by the CPU, and this is how the control unit 20 realizes the above-mentioned functions. Image data indicating images captured by the image sensor 12 are temporarily stored in the RAM. To realize the above-mentioned functions related to movement amount detection, the control programs comprise program modules, such as an illumination control section 20*a*, an image acquisition section 20*b*, an estimated movement amount calculating section 20*c*, an error information acquisition section 20*d*, and a movement amount calculating section 20*e*.

The illumination control section 20*a* has the function of controlling the switching of the LED 10 on and off The LED 10 and the illumination control section 20*a* correspond to an illumination unit. The image acquisition section 20*b* has the function of directing that images of the printing medium P, which is being conveyed in a state in which the LED 10 is switched on, be captured at specific time intervals, and acquiring in the RAM image data indicating the captured image. The image sensor 12 and the image acquisition section 20*b* correspond to an image acquisition unit. The estimated movement amount calculating section 20*c* (corresponds to an estimated movement amount calculation section) has the function of performing template matching processing on image data indicating two images consecutively captured at a specific time interval in a state in which the LED 10 has been switched on, and calculating the estimated movement amount, which is the estimated value for the amount the printing medium P has moved in between the capture of the two images.

Figure 2:
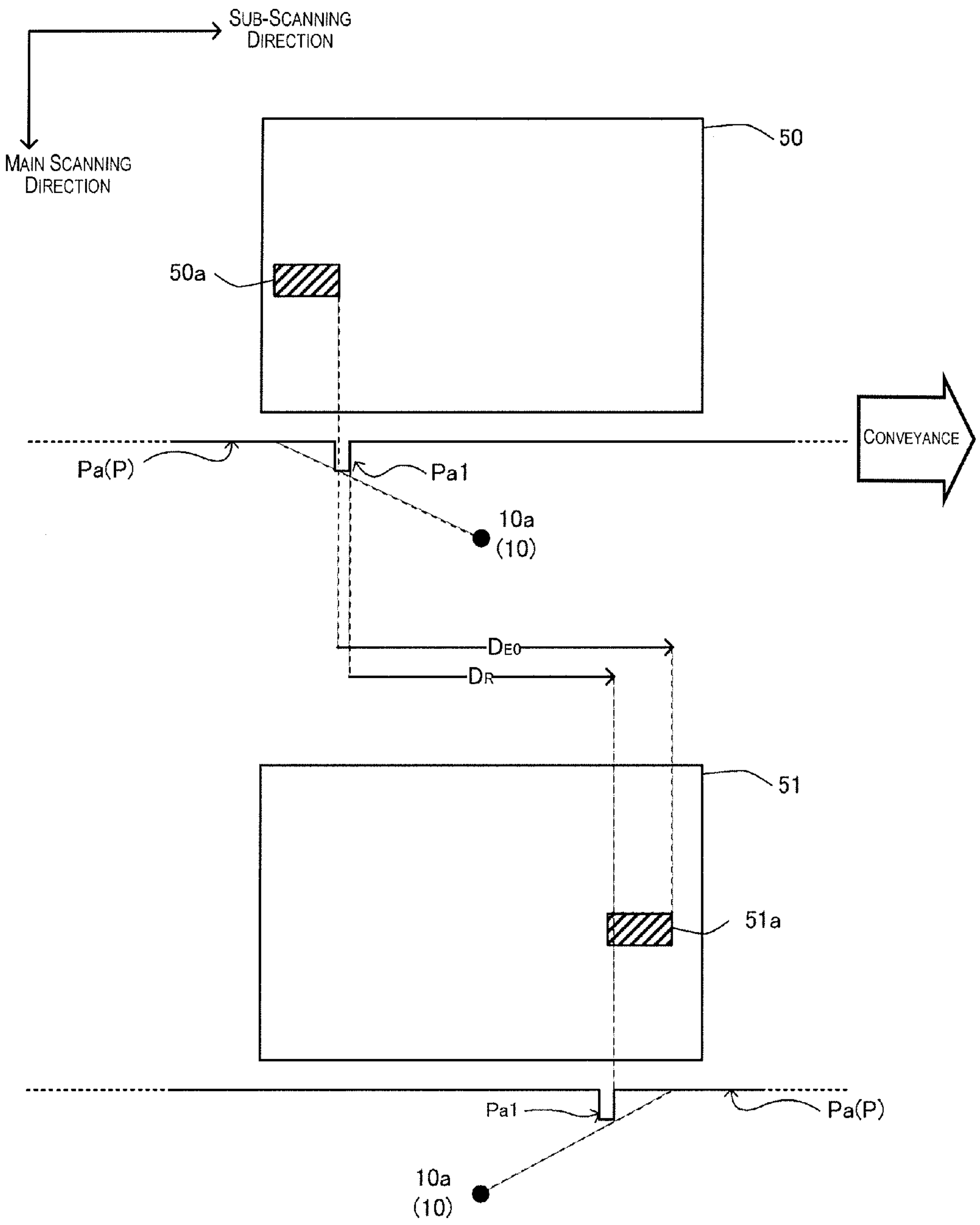
FIG. 2 is a simplified diagram illustrating error attributable to illumination conditions.

The error information acquisition section 20*d* (corresponds to an error information acquisition section) has the function of acquiring error information for correcting the error that may be included in the estimated movement amount calculated by the processing of the above-mentioned estimated movement amount calculating section 20*c*. The error information is produced ahead of time by a method discussed below, and in this embodiment is stored ahead of time in the ROM. When the processing of the error information acquisition section 20*d* is executed, this information is read from the ROM to the RAM and utilized in the processing of the movement amount calculating section 20*e* discussed below. FIG. 2 is a simplified diagram illustrating error in the estimated movement amount. For example, as shown in FIG. 2, let us assume that there is a tiny bump Pa1 on the irradiated face Pa of the printing medium P, and in a state in which the irradiated face Pa is irradiated from a light source 10*a* (the LED 10), there are images 50 and 51 captured when the printing medium P is being conveyed in the sub-scanning direction. FIGS. 50*a* and 51*a* corresponding to shadows produced on the irradiated face Pa when light is emitted from the light source 10*a* at the bump Pa1 are included in the images 50 and 51. We will let $D_R$ be the actual movement amount of the printing medium P (the actual movement amount of the bump Pa1). The length $D_{E0}$ over the irradiated face Pa corresponding to the difference in the positions of the FIGS. 50*a* and 51*a* corresponding to shadows is different from the actual movement amount $D_R$. At the estimated movement amount calculating section 20*c*, the region to be matched, which is constituted by a distinctive pattern including a plurality of these shadows, is set within the image 50. Then, the difference between the position within the other image 51 of a similar region that is most light said region to be matched and the position within the image 50 of the region to be matched is calculated. The length over the irradiated face Pa corresponding to this difference is calculated as the estimated movement amount $D_E$. We shall let the difference between the actual movement amount $D_R$ and the estimated movement amount $D_E$ be the error Δd.

The movement amount calculating section 20e (corresponds to a movement amount calculation section) has the function of calculating the movement amount indicating the amount that the printing medium P has moved in between the capture of the two images by correcting the estimated movement amount using the error corresponding to the estimated movement amount.

1-2. Production of Error Information

Figure 3:
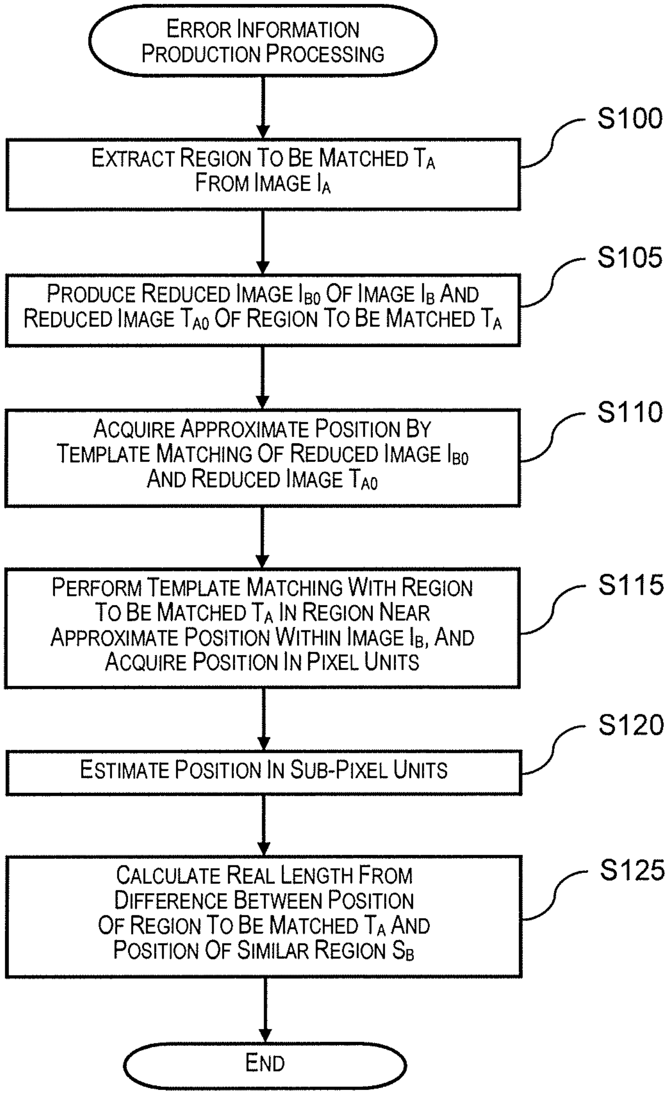
FIG. 3 is a flowchart of error information production processing pertaining to an embodiment of the present invention.
Figure 4:
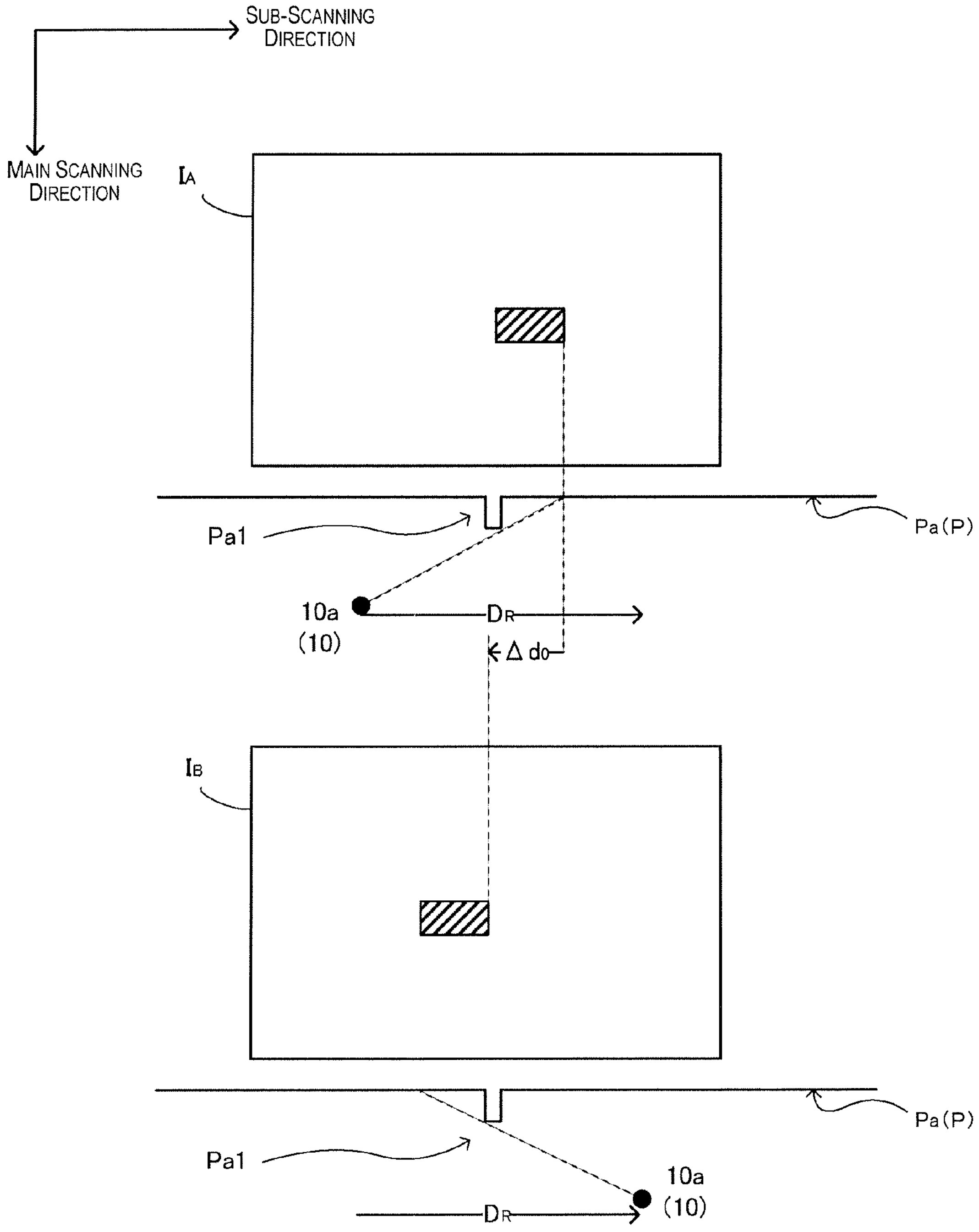
FIG. 4 is a simplified diagram illustrating a configuration for error calculation pertaining to an embodiment of the present invention.
Figure 5:
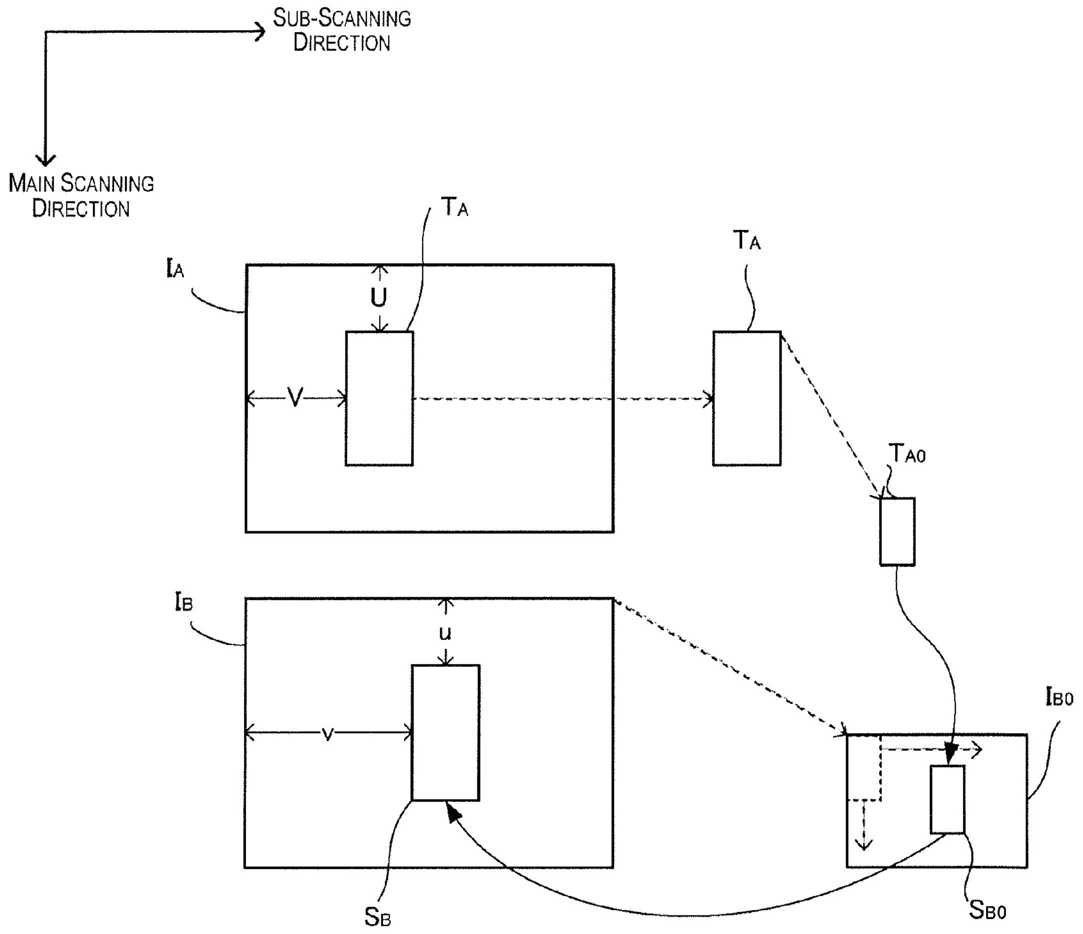
FIG. 5 is a simplified diagram illustrating template matching processing pertaining to an embodiment of the present invention.

FIG. 3 is a flowchart of the processing in which the above-mentioned error information is produced. The processing shown in FIG. 3 is carried out ahead of time, prior to the shipping of the printing device, in a test device that is the same as the printing device in terms of the positional relations between the image sensor 12, the optical system, the LED 10, the conveyance plane in which the printing medium P is conveyed, and so on. FIG. 4 is a simplified diagram illustrating a configuration for error in this embodiment, and FIG. 5 is a simplified diagram illustrating template matching processing in this embodiment. In producing error information, in this embodiment, as shown in FIG. 4, in a state in which the printing medium P is fixed (although not shown in FIG. 4, the optical system and the image sensor 12 are also fixed), the light source 10a (the LED 10) that irradiates the irradiated face Pa of the printing medium P is moved in a direction parallel to the sub-scanning direction of the printing medium P while images are captured of the same region of the irradiated face Pa of the printing medium P with the image sensor 12 (the captured images shall be termed images $I_A$ and $I_B$). The position of the tiny bump Pa1 on the irradiated face Pa of the printing medium P does not change, but the shape and position of the shadow made by the light from the light source 10a directed at the bump Pa1 do change with the amount of movement of the light source 10a, as shown in FIG. 4.

The processing in FIG. 3 is performed on the two images $I_A$ and $I_B$ captured as above. The processing in FIG. 3 will be described through reference to FIG. 5. First, a region to be matched $T_A$ is set within the image $I_A$, and this region to be matched $T_A$ is extracted (step S100). Then, a reduced image $I_{B0}$ of the image $I_B$ is produced from the image $I_B$, and a reduced image $T_{A0}$ of the region to be matched $T_A$ is produced from the image of the region to be matched $T_A$ (step S105). The reduction ratio is the same for both. Then, the reduced image $I_{B0}$ and the reduced image $T_{A0}$ are subjected to template matching, which determines the position of the similar region $S_{B0}$ most like the reduced image $T_{A0}$ of the region to be matched $T_A$ within the reduced image $I_{B0}$, and determines the approximate position of the similar region $S_B$ within the image $I_B$ (step S110). The reason for first finding the approximate position by template matching between the reduced images is to shorten the processing time. Therefore, if there are no particular restrictions on processing time in the production of error information, the image $I_B$ and the region to be matched $T_A$ may be subjected to template matching from the outset, rather than using the reduced images. However, in the movement amount detection processing discussed below, the amount of movement of the printing medium P needs to be repeatedly detected at specific times during the conveyance of the printing medium P, so detecting the precise position after first detecting the approximate position using reduced images is effective from the standpoint of shortening the processing time.

Next, template matching is again performed on the region to be matched $T_A$ and a region near the region corresponding to the above-mentioned approximate position within the image $I_B$, and the position of the similar region $S_B$ most like the region to be matched $T_A$ is determined in pixel units within the image $I_B$ (step S115). The algorithm for the template matching processing can be selected from among any of various known algorithms. More specifically, a region to be compared, of the same size as the region to be matched $T_A$ in the image $I_B$, for example, is set, the similarity to the region to be matched $T_A$ is calculated while shifting the region to be compared by one pixel at a time, and the similarity is stored in association with a representative pixel of the region to be compared. The coordinates of the representative pixel for the region to be compared, at which the similarity is the highest within the image $I_B$, is then identified.

Then, the similar region $S_B$ is estimated within the image $I_B$ in units finer than those of the position found in step S115 (sub-pixel units) (step S120). For example, the similarity of sub-pixels is found by interpolation on the basis of the similarity associated with the coordinates specified in step S115 and the similarity associated with the nearby coordinates. The coordinates with the highest similarity are specified in sub-pixel units. Finally, the distance over the irradiated face Pa corresponding to the difference between the position of the region to be matched $T_A$ within the image $I_A$ and the position of the similar region $S_B$ within the image $I_B$ (positions expressed in sub-pixel units) is calculated (step S125). More specifically, the difference (v−V) between the position of the region to be matched $T_A$ within the image $I_A$ and the position of the region to be compared within the image $I_B$ having the highest similarity in sub-pixel units is found in the direction corresponding to the sub-scanning direction. This difference is multiplied by the length over the irradiated face Pa per pixel to calculate the distance over the irradiated face Pa corresponding to the difference.

Figure 6:
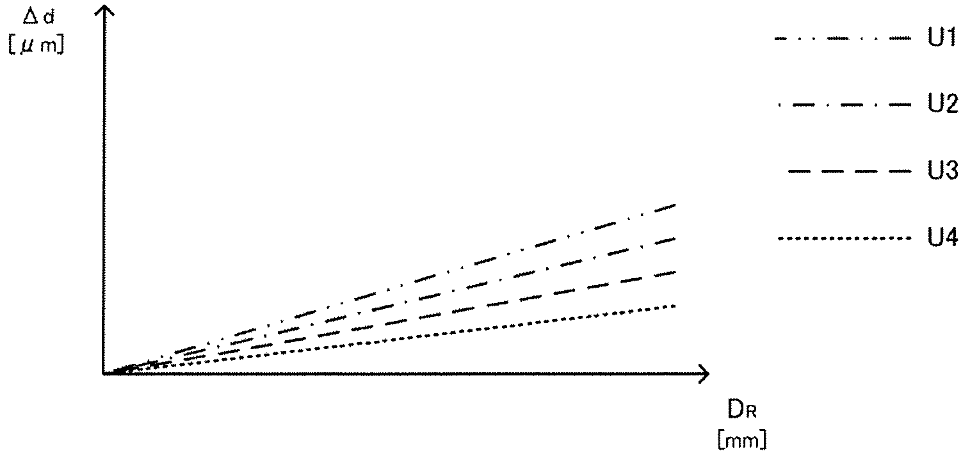
FIG. 6 is a graph of the relation between the actual movement amount and error pertaining to an embodiment of the present invention.

The printing medium P, the optical system, and the image sensor 12 are fixed, and the image sensor 12 captures an image of the same region as the irradiated face Pa of the printing medium P, so the position of the region to be matched $T_A$ within the image $I_A$ should be the same as the position of the similar region $S_B$ within the image $I_B$ (a difference of zero), but in this case the light source 10a is moving, and the positions of these regions (the difference) varies according to how much the light source 10a moves. Therefore, this difference is equivalent to error attributable to illumination conditions. FIG. 4 shows that the value of the change $\Delta d_0$ on the irradiated face Pa in the position of the shadow corresponding to the bump Pa1 varies according to the actual movement amount $D_R$ of the light source 10a. Similarly, the distance Δd on the irradiated face Pa corresponding to the difference between the position of the region to be matched $T_A$ and the position of the similar region $S_B$ varies according to the actual movement amount $D_R$ as shown in FIG. 6. In the movement amount detection processing in this embodiment (discussed below), the estimated movement amount $D_E$ is corrected by subtracting the error Δd corresponding to the estimated movement amount $D_E$ from the estimated movement amount $D_E$ (the error found by template matching in movement amount detection processing corresponds to the estimated movement amount $D_E$). Accordingly, the correlation between the sum obtained by adding the actual movement amount $D_R$ and the error Δd corresponding to the actual movement amount $D_R$, and the error Δd corresponding to this sum is recorded as error information. In the movement amount detection processing, this sum is what is compared with the estimated movement amount $D_E$.

The above-mentioned error is calculated and recorded for each distance in the sub-scanning direction between the light source and the region on the surface of the printing medium P corresponding to the region to be matched $T_A$. The light source 10*a* is moved only in the sub-scanning direction with respect to the printing medium P. Also, during the printing operation (discussed below), the printing medium P moves in the sub-scanning direction with respect to the light source 10*a* (the LED 10). Therefore, the distance between the light source 10*a* (the LED 10) and the imaging region of the image sensor 12 is fixed (see FIG. 1), so the error Δd corresponding to the actual movement amount $D_R$ is calculated as shown in FIG. 6 according to the distance U (see FIG. 5) from the position within the image $I_A$ in a direction corresponding to the main scanning direction, that is, from the end nearer the light source 10*a* within the image $I_A$ in a direction corresponding to the main scanning direction, and the correlation between Δd and the sum ($D_R$+Δd) is recorded as error information just as above. The degree of change in the shape or position of the shadows corresponding to bumps on the surface of the medium also depends on the distance between the light source 10*a* in the main scanning direction and the region of the printing medium P corresponding to the region to be matched. Accordingly, the error corresponding to the estimated movement amount (in a direction parallel to the conveyance direction of the medium) also varies according to the above-mentioned distance U. Therefore, the accuracy at which the amount of movement of the printing medium P is detected as calculated in the movement amount detection processing discussed below can be further increased by readying error information according to this distance U.

The error Δd calculated in this way is equivalent to the difference produced between the actual movement amount $D_R$ and the estimated movement amount $D_E$ calculated by template matching when the printing medium P is moved by the actual movement amount $D_R$ in a state in which the image sensor 12 and the light source 10*a* are fixed. Therefore, the constitution for calculating error, unlike the above-mentioned constitution for error calculation, may be such that, as shown in FIG. 2, the printing medium P is moved in a state in which the image sensor 12, the LED 10, and the optical system are fixed, the estimated movement amount $D_E$ is calculated with respect to the actual movement amount $D_R$ of the printing medium P, and this correlation is recorded as error information.

1-3. Movement Amount Detection Processing

Figure 7:
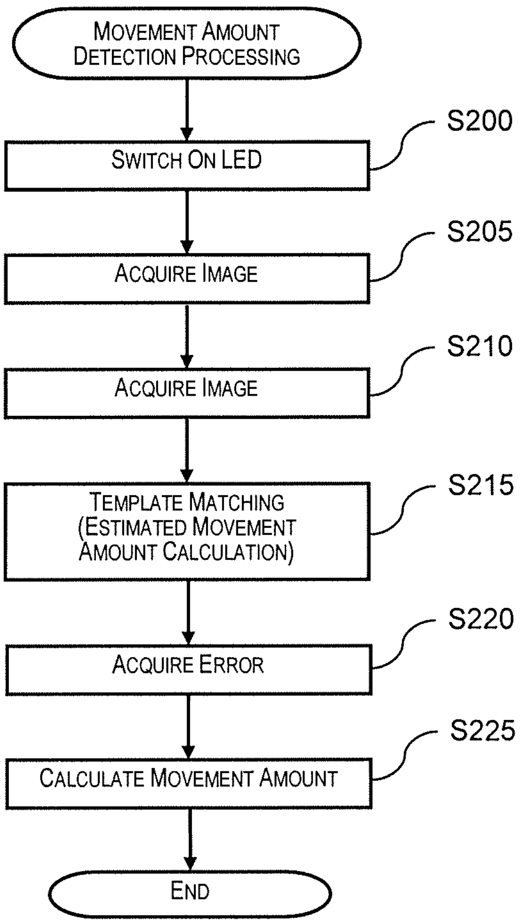
FIG. 7 is a flowchart of movement amount detection processing pertaining to an embodiment of the present invention.

Next, processing for accurately calculating the amount of movement of the printing medium P using error information that has been prerecorded as above will be described through reference to FIG. 7. When the printing medium P begins to be conveyed in the sub-scanning direction in order to perform printing on the printing medium P in the printing device, the control unit 20 switches on the LED 10 by processing of the illumination control section 20*a* (step S200), and images of the printing medium P are acquired at specific time intervals by the image sensor 12 by the processing of the image acquisition section 20*b* (step S205 and step S210). Then, the control unit 20 calculates the estimated movement amount $D_E$ of the printing medium P by template matching by the processing of the estimated movement amount calculating section 20*c* (step S215). The processing carried out here will not be described again because it is the same as that in steps S100 to S125 described for FIG. 3. The length calculated in step S125 of FIG. 3 in the movement amount detection processing corresponds to the estimated movement amount $D_E$.

Then, the control unit 20 refers to the error information and acquires the value of the error Δd corresponding to the distance U from the estimated movement amount $D_E$ (the position in the main scanning direction of the region to be matched $T_A$ within the image $I_A$) by the processing of the error information acquisition section 20*d* (step S220). More specifically, the control unit 20 acquires the error Δd when the value of the sum at the distance U (actual movement amount $D_R$+error Δd) is the same as the estimated movement amount $D_E$. The control unit 20 then uses the error Δd to correct the estimated movement amount $D_E$, and calculates the amount the printing medium P has moved during the time interval at which the two images used in template matching were captured (step S225). For example, the amount of movement is calculated by subtracting the error Δd corresponding to the estimated movement amount $D_E$ from the estimated movement amount $D_E$. Thus, in this embodiment, the effect of error attributable to illumination conditions is reduced, and the amount of movement of the printing medium P can be detected more accurately. The processing in steps S210 to S225 is repeated at specific time intervals during the conveyance of the printing medium P. In step S215, template matching is performed on the image acquired in step S210 in the previous iteration of these repetitions and on the image acquired in the current step S210. The movement amount calculated in step S225 is fed back at specific time intervals to the processor controlling the amount of rotation of the conveyance roller, which helps improve the accuracy of conveyance of the printing medium by the conveyance roller.

2. Other Embodiments

The technological scope of the present invention is not limited to the embodiments given above, and various modifications can of course be added without departing from the gist of the invention. For example, the estimated movement amount may be corrected by measuring error information according to the number or layout of the lighting used in imaging, and referring to this error information corresponding to the number or layout of the lighting. Also, if the printing device comprises a plurality of types of light source, and the light sources (laser, LED, or the like) are used according to the type of printing medium, then error information may be produced ahead of time according to the types of light source, and this error information then used according to the type of light source being used.

In the above embodiments, the movement amount detection device was shown as being installed in a printing device as a device having the function of conveying a sheet-like medium. In addition to this, the movement amount detection device present invention may also be applied to a scanner, a facsimile machine, or another such image reading device as a device equipped with a conveyance function. Specifically, the present invention may be applied to a scanner, a facsimile machine, or another such ADF (automatic document feeder).

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A movement amount detection device comprising:

an illumination unit configured to illuminate one side of a medium;

an image acquisition unit configured to capture a first image and a second image of the one side of the medium conveyed in a state of being illuminated by the illumination unit to acquire the images;

an estimated movement amount calculation section configured to determine a similar region whose characteristic is most similar to a characteristic of a region to be matched, which is set within the first image, within the second image based on a shadow corresponding to a bump on the one side of the medium in the state of being illuminated by the illumination unit, and to calculate an estimated movement amount of the medium from a positional relation between the region to be matched and the similar region;

an error information acquisition section configured to acquire error information indicating a correspondence between error in the estimated movement amount attributable to an angle of light directed at the medium by the illumination unit and the estimated movement amount; and a movement amount calculation section configured to correct the estimated movement amount and to calculate the movement amount of the medium between a point when the first image is captured and a point when the second image is captured.

2. The movement amount detection device according to claim 1, wherein the error information is produced ahead of time according to a distance between a light source of the illumination unit and the region on the one side of the medium corresponding to the region to be matched set within the first image in a direction perpendicular to the medium, and the movement amount calculation section is configured to correct the estimated movement amount by using the error information according to the distance corresponding to the region to be matched set at the estimated movement amount calculation section.

3. The movement amount detection device according to claim 1, wherein the error information is produced ahead of time according to a number of light sources of the illumination unit and disposition of the light sources, and the movement amount calculation section is configured to correct the estimated movement amount by using the error information according to the number and disposition of the light sources of the illumination unit.

4. An error information production method comprising:

illuminating one side of a medium;

acquiring a first image of the one side of the medium;

moving the medium and a light source relatively by an actual movement amount;

acquiring a second image of the one side of the medium after movement;

among the first image captured before movement and the second image captured after movement, determining a similar region whose characteristic is most similar to a characteristic of a region to be matched, which is set within the first image, within the second image based on a shadow corresponding to a bump on the one side of the medium in the state of being illuminated by the illumination unit; and calculating a difference between a position of the region to be matched and a position of the similar region, which is a difference that varies with an angle of a light emitted from a light source onto the one side of the medium.

* * * * *